(12) United States Patent
Weikard et al.

(10) Patent No.: US 7,666,970 B2
(45) Date of Patent: *Feb. 23, 2010

(54) RADIATION-CURING BINDERS AND A PROCESS FOR THEIR PREPARATION

(75) Inventors: Jan Weikard, Odenthal (DE); Christoph Gürtler, Köln (DE); Wolfgang Fischer, Meerbusch (DE); Jörg Schmitz, Köln (DE); Holger Mundstock, Wermelskirchen (DE)

(73) Assignee: Bayer MaterialScience AG, Leverkusen (DE)

( * ) Notice: Subject to any disclaimer, the term of this patent is extended or adjusted under 35 U.S.C. 154(b) by 495 days.

This patent is subject to a terminal disclaimer.

(21) Appl. No.: 11/217,728

(22) Filed: Sep. 1, 2005

(65) Prior Publication Data
US 2006/0051591 A1 Mar. 9, 2006

(30) Foreign Application Priority Data
Sep. 9, 2004 (DE) ................... 10 2004 043 537

(51) Int. Cl.
*C08G 18/04* (2006.01)
*C08G 18/08* (2006.01)
*C08G 18/00* (2006.01)
*C08G 18/78* (2006.01)

(52) U.S. Cl. ............... 528/48; 522/90; 522/97; 526/301; 526/302; 528/45; 528/49; 528/51; 528/52; 528/57; 528/59; 528/65; 528/69; 528/75; 528/76; 528/80; 528/85

(58) Field of Classification Search ........... 528/45, 528/48, 49, 51, 52, 57, 59, 65, 69, 75, 76, 528/80, 85; 522/90, 97; 526/301, 302
See application file for complete search history.

(56) References Cited

U.S. PATENT DOCUMENTS

| | | | |
|---|---|---|---|
| 4,160,080 A | 7/1979 | Köenig et al. | 528/59 |
| 5,672,736 A | 9/1997 | Brahm et al. | 560/345 |
| 5,777,024 A | 7/1998 | Killilea et al. | 524/590 |
| 5,917,083 A | 6/1999 | König et al. | 560/157 |
| 6,392,001 B1 | 5/2002 | Mertes et al. | 528/59 |
| 6,617,413 B1 * | 9/2003 | Bruchmann et al. | 528/75 |
| 6,914,115 B2 | 7/2005 | Spyrou et al. | 528/45 |
| 2003/0153673 A1 | 8/2003 | Schwalm et al. | 524/589 |
| 2003/0153713 A1 | 8/2003 | Spyrou et al. | 528/48 |
| 2004/0068028 A1 | 4/2004 | Baumgart et al. | 522/148 |

FOREIGN PATENT DOCUMENTS

GB 994890 6/1965

OTHER PUBLICATIONS

Database WPI Week 200347 Derwent Publications Ltd., London, GB; AN 2003-782662 XP002359796 "Energy-beam curable resin composition" & JP 2003 048927 A (Dainippon Ink & Chem) Feb. 21, 2003.
Proceedings of the International Waterborne, High-Solids, and Powder Coatings Symposium Feb. 21-23, 2001, 28th, pp. 405-419, Michaela Gedan-Smolka et al, "New Catalysts for the Low Temperature Curing of Uretdione Powder Coatings".
Angew. Makromol. Chem., 171, (month unavailable) 1989, pp. 21-38, Fleix Schmitt, "Isocyanatfreie, zweikomponentige Polyurethansysteme".
Proceedings of the International Waterborne, High-Solids, and Powder Coatings Symposium Feb. 21-23, 2001, pp. 77-89, K.B. Chandalia et al, "New Non-Isocyanate Curatives for 2K Solvent-Borne Urethane Coatings".
Macromol. Symp. 187, (month unavailable) 2002, pp. 531-542, T. Jung, A. Valet, "Scratch Resistance and Weatherfastness of UV-Curable Clearcoats".

* cited by examiner

*Primary Examiner*—Ana L Woodward
(74) *Attorney, Agent, or Firm*—Robert S. Klemz; Noland J. Cheung

(57) ABSTRACT

The invention relates to a process for preparing binders which contain 1) allophanate groups, 2) groups that react with ethylenically unsaturated compounds with polymerization on exposure to actinic radiation (radiation-curing groups) and 3) optionally NCO-reactive groups, by reacting at temperatures $\leq 130°$ C.
A) one or more NCO-functional compounds containing uretdione groups with
B) one or more compounds that contain isocyanate-reactive groups and groups that react with ethylenically unsaturated compounds with polymerization on exposure to actinic radiation (radiation-curing groups), and then
C) with one or more saturated, hydroxyl-containing compounds other than B),
at least one of these compounds having an OH functionality of $\geq 2$, in the presence of
D) a catalyst containing one or more ammonium salts or phosphonium salts of aliphatic or cycloaliphatic carboxylic acids,
the reaction with compounds C) taking place at least proportionally with the formation of allophanate groups.

The present invention also relates to the binders obtained by the process of the invention.

10 Claims, No Drawings

RADIATION-CURING BINDERS AND A PROCESS FOR THEIR PREPARATION

BACKGROUND OF THE INVENTION

1. Field of the Invention

The present invention relates to a process for preparing binders which contain allophanate groups, groups that react with ethylenically unsaturated compounds with polymerization on exposure to actinic radiation and which optionally also contain isocyanate-reactive groups, to the resulting binders and to their use in coating compositions.

2. Description of Related Art

The curing of coating systems which carry activated double bonds by actinic radiation, such as UV light, IR radiation or electron beams, is known and is established in industry. It is one of the most rapid curing methods in coating technology. Coating compositions based on this principle are thus referred to as radiation- or actinically curing or curable systems.

Particularly advantageous properties can be obtained if the radiation cure is combined with a second crosslinking step so that it can be controlled independently therefrom. Coating systems of this kind are referred to as dual-cure systems (e.g. Macromol. Symp. 187, 531-542, 2002, defined on p. 534).

Because of the environmental and economic requirements imposed on modern coating systems, i.e., that they should use as little organic solvents as possible, or none at all, for adjusting the viscosity, there is a desire to use coatings raw materials which are already of low viscosity. Known for this purpose are polyisocyanates having allophanate groups as described, inter alia, in EP-A 0 682 012.

In industry these substances are prepared by reacting a monohydric or polyhydric alcohol with excess aliphatic and/or cycloaliphatic diisocyanate (cf GB-A 994 890, EP-A 0 000 194 or EP-A 0 712 840). This is followed by removal of unreacted diisocyanate by means of distillation under reduced pressure. According to DE-A 198 60 041 this procedure can also be carried out with OH-functional compounds having activated double bonds, such as hydroxyalkyl acrylates, although difficulties occur in relation to the preparation of particularly low-monomer products. Since the distillation step has to take place at temperatures up to 135° C., in order to be able to lower the residue isocyanate content sufficiently (<0.5% by weight of residual monomer), it is possible for double bonds to react, with polymerization, under thermal initiation, even during the purification process, meaning that ideal products are no longer obtained.

EP-A 0 825 211 describes a process for synthesizing allophanate structures from oxadiazinetriones, although no radiation-curing derivatives with activated double bonds are known. All that is mentioned is the use of maleinate- and/or fumarate-containing polyesters; the possibility of radiation curing is not described.

U.S. Pat. No. 5,777,024 describes the preparation of radiation-curing allophanates of low viscosity by a reaction of hydroxy-functional monomers that carry activated double bonds with allophanate-modifier isocyanurates that contain NCO groups.

The formation of allophanate compounds by ring opening of uretdiones with alcohols is known in principle as a crosslinking mechanism in powder coating materials (cf. Proceedings of the International Waterborne, High-Solids, and Powder Coatings Symposium 2001, 28th, 405-419, and also U.S.-A 2003/0153713). Nevertheless, the reaction temperatures required for this purpose are too high (≧130° C.) for a targeted preparation of radiation-curing monomers based on allophanate with activated double bonds.

Historically the direct reaction of uretdione rings with alcohols to allophanates was first investigated for solvent-borne, isocyanate-free, 2K [2-component] polyurethane coating materials. Without catalysis this reaction is of no technical importance, due to the low reaction rate (F. Schmitt, Angew. Makromol. Chem. (1989), 171, pp. 21-38). With appropriate catalysts, however, the crosslinking reaction between HDI-based uretdione curatives and polyols is said to begin at 60 to 80° C. (K. B. Chandalia; R. A Englebach; S. L. Goldstein; R. W. Good; S. H. Harris; M. J. Morgan; P. J. Whitman; R. T. Wojcik, Proceedings of the International Waterborne, High-Solids, and Powder Coatings Symposium, (2001), pp. 77-89). The structure of these catalysts has not been published to date. Commercial products prepared by utilizing this reaction are also undisclosed to date.

In summary it may be stated that the preparation of radiation-curing allophanates of low viscosity having isocyanate-reactive groups by a ring-opening reaction of alcohols that carry activated double bonds with uretdiones at temperatures ≦130° C. is not explicitly described by the prior art.

Surprisingly it has now been found that from the reaction of uretdiones with olefinic unsaturated alcohols that preferably contain activated double bonds and saturated compounds having at least two isocyanate-reactive groups it is possible, using ammonium salts or phosphonium salts of aliphatic carboxylic acids as catalysts, to obtain radiation-curing allophanates of low viscosity with low residual monomer fractions at temperatures even of ≦130° C. When such crosslinkers contain not only radiation-curing functions but also functions that are reactive towards NCO groups, they are referred to as dual-cure crosslinkers.

SUMMARY OF THE INVENTIONN

The invention relates to a process for preparing binders which contain 1) allophanate groups, 2) groups that react with ethylenically unsaturated compounds with polymerization on exposure to actinic radiation (radiation-curing groups) and 3) optionally NCO-reactive groups, by reacting at temperatures ≦130° C.
A) one or more NCO-functional compounds containing uretdione groups with
B) one or more compounds that contain isocyanate-reactive groups and groups that react with ethylenically unsaturated compounds with polymerization on exposure to actinic radiation (radiation-curing groups), and then
C) with one or more saturated, hydroxyl-containing compounds other than B), at least one of these compounds having an OH functionality of ≧2, in the presence of
D) a catalyst containing one or more ammonium salts or phosphonium salts of aliphatic or cycloaliphatic carboxylic acids, the reaction with compounds C) taking place at least proportionally with the formation of allophanate groups.

The present invention also relates to the binders obtained by the process of the invention.

The present invention further relates to coating compositions comprising
a) one or more binders obtained in accordance with the invention,
b) optionally one or more polyisocyanates containing free or blocked isocyanate groups, which optionally contain groups which react with ethylenically unsaturated compounds with polymerization on exposure to actinic radiation, c) optionally compounds other than a), which contain groups which react with ethylenically unsaturated compounds with polymerization on exposure to actinic radiation, and optionally contain NCO-reactive groups, d) optionally one or more isocyanate-reactive compounds containing an active hydrogen which are free from groups which react with ethylenically unsaturated compounds with polymerization on exposure to actinic radiation, and e) one or more initiators.

DETAILED DESCRIPTION OF THE INVENTION

For the purposes of the present inventions the terms "radiation-curing groups", "actinically curing groups" and "groups that react with ethylenically unsaturated compounds with polymerization on exposure to actinic radiation" are used synonymously.

The compounds of component B) include groups that react with ethylenically unsaturated compounds with polymerization on exposure to actinic radiation, such as vinyl, vinyl ether, propenyl, allyl, maleyl, fumaryl, maleimide, dicyclopenta-dienyl, acrylamide, acryloyl and methacryloyl groups. Preferred activated groups are vinyl ether, acrylate and/or methacrylate groups, more preferably acrylate groups.

NCO-reactive groups include OH-, SH- and NH-functional compounds, preferably hydroxyl groups, primary or secondary amino groups and aspartate groups, and more preferably hydroxyl groups.

Component A) includes any organic compounds which have at least one uretdione and one NCO group. The compounds used in A) preferably have a uretdione group content (calculated as $C_2N_2O_2$=84 g/mol) of from 3% to 60%, more preferably from 10% to 50%, and most preferably from 25% to 40% by weight.

The compounds used in A), in addition to having uretdione groups, also preferably have from 3% to 60%, more preferably from 10% to 50%, and most preferably from 15% to 25% by weight of NCO groups (calculated as NCO=42 g/mol).

These compounds are preferably prepared by the catalytic dimerization of aliphatic, cycloaliphatic, aromatic and/or araliphatic di- or polyisocyanates using known processes (cf. J. Prakt. Chem. 1994, 336, page 196-198).

Suitable diisocyanates include 1,4-diisocyanatobutane, 1,6-diisocyanatohexane, trimethylhexane diisocyanate, 1,3- and 1,4-bis-isocyanatomethylcyclohexane, isophorone diisocyanate (IPDI), 4,4'-diisocyanatodicyclohexylmethane, 1,3- and 1,4-xylylene diisocyanate (XDI commercial product of Takeda, Japan), diphenylmethane 4,4'-diisocyanate and diphenylmethane 2,4'-diisocyanate (MDI), 2,4- and 2,6-toluene diisocyanate (TDI), or mixtures thereof. For the purposes of the invention it is preferred to use 1,6-diisocyanatohexane, isophorone diisocyanate or mixtures thereof.

Examples of catalysts employed for the dimerization reaction include trialkylphosphines, dimethylaminopyridines and tris(dimethylamino)phosphine. The result of the dimerization reaction depends in known manner on the catalyst used, on the process conditions and on the diisocyanates employed. In particular it is possible for products to be formed which contain on average more than one uretdione group per molecule, the number of uretdione groups being subject to a distribution. Depending upon the catalyst used, the process conditions and the diisocyanates employed, product mixtures are also formed which in addition to uretdiones also contain other structural units, such as isocyanurate and/or iminooxadiazinedione.

Particularly preferred products may be obtained by the catalytic dimerization of HDI and have a free HDI content of less than 0.5% by weight; an NCO content of 17 to 25% by weight, preferably of 21 to 24% by weight; and a viscosity at 23° C. of from 20 to 500 mPa·s, preferably from 50 to 200 mPa·s.

The generally NCO-functional compounds obtained by catalytic dimerization are preferably used directly as part of component A), but they can also first be subjected to further reaction and then used as component A). Further reactions include blocking the free NCO groups or further reaction of the NCO groups with NCO-reactive compounds having a functionality of two or more to form iminooxadiazinedione, isocyanurate, urethane, allophanate, biuret urea, oxadiazinetrione, oxazolidinone, acylurea or carbodiimide groups. This results in compounds containing uretdione groups having a higher molecular weight, which, depending on the chosen proportions, have different NCO contents.

Suitable blocking agents include alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or mixtures of these blocking agents. The procedure for the blocking of NCO groups is well known and described in Progress in Organic Coatings 1999, 36, 148-172.

NCO-reactive compounds having a functionality of two or more for derivatizing the uretdiones used in A) can be the preceding di- and/or polyisocyanates, and also simple alcohols with a functionality of two or more, such as ethylene glycol, propane-1,2-diol, propane-1,3-diol, diethylene glycol, dipropylene glycol, the isomeric butanediols, neopentyl glycol, hexane-1,6-diol, 2-ethylhexanediol, tripropylene glycol and the alkoxylated derivatives of these alcohols. Preferred dihydric alcohols are hexane-1,6-diol, dipropylene glycol and tripropylene glycol. Suitable trihydric alcohols include glycerol or trimethylolpropane or their alkoxylated derivatives. Tetrahydric alcohols include pentaerythritol or its alkoxylated derivatives.

Additionally it is also possible to use compounds having a hydrophilic action and containing at least one isocyanate-reactive group for the derivatization, individually or as a mixture. Compounds having a hydrophilic action are preferably used when the product of the invention is to be dissolved or dispersed in water or aqueous mixtures.

Suitable compounds with a hydrophilic action include all ionic, potential ionic and nonionic hydrophilic compounds having at least one isocyanate-reactive group. As isocyanate-reactive groups, these compounds preferably contain hydroxy and/or amino functions.

Ionic or potential ionic hydrophilic compounds are compounds which have at least one isocyanate-reactive group and also at least one functionality, such as —COOY, —$SO_3Y$, —PO(OY)$_2$ (Y=H, $NH_4^+$, metal cation), —$NR_2$, —$NR_3^+$, —$PR_3^+$(R=H, alkyl, aryl). By potential ionic hydrophilic groups are those compounds which on interaction with aqueous media enter into an optionally pH-dependent dissociation equilibrium and thus have a negative, positive or neutral charge.

Examples of suitable ionic compounds or compounds containing potential ionic groups are mono- and dihydroxycarboxylic acids, mono- and diaminocarboxylic acids, monoand dihydroxysulphonic acids, mono- and diaminosulphonic acids, mono- and dihydroxyphosphonic acids or mono- and diaminophosphonic acids and their salts. Examples include dimethylol propionic acid, dimethylolbutyric acid, hydroxypivalic acid, N-(2-aminoethyl)-β-alanine, 2-(2-aminoethylamino)-ethanesulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts, the adduct of sodium bisulphite with but-2-ene-1,4-diol, polyethersulphonate, the propoxylated adduct of 2-butenediol and NaHSO$_3$ (described for example in DE-A 2 446 440, page 5-9, formula I-III) and also structural units which can be converted into cationic groups, such as N-methyldiethanolamine.

Preferred ionic or potential ionic compounds are those having carboxyl or carboxylate, sulphonate groups and/or ammonium groups. Particularly preferred ionic compounds are those which contain carboxyl and/or sulphonate groups as ionic or potential ionic groups, such as the salts of N-(2-aminoethyl)-p-alanine, 2-(2-aminoethylamino)ethanesulphonic acid, the adduct of IPDI and acrylic acid (EP-A-0 916 647, Example 1) and also dimethylolpropionic acid.

As hydrophilic nonionic compounds it is possible to use compounds with a polyether structure, preferably alkylene oxide-based polyethers which contain at least one hydroxy or amino group as isocyanate-reactive group.

These compounds with a polyether structure include monofunctional polyalkylene oxide polyether alcohols containing on average 5 to 70, preferably 7 to 55, ethylene oxide units per molecule, with at least 30 mol % of ethylene oxide, such as those obtained in known manner by alkoxylating suitable starter molecules (e.g. in Ullmanns Encyclopadie der technischen Chemie, 4th Edition, Vol. 19, Verlag Chemie, Weinheim, pp. 31-38).

Examples of suitable starter molecules include saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-ethyl-3-hydroxymethyloxetane, tetrahydrofurfuryl alcohol, diethylene glycol monoalkyl ethers such as diethylene glycol monobutyl ether, unsaturated alcohols (such as allyl alcohol, 1,1-dimethylallyl alcohol or oleyl alcohol), aromatic alcohols such as phenol, the isomeric cresols or methoxyphenols, araliphatic alcohols (such as benzyl alcohol, anisyl alcohol or cinnamyl alcohol), secondary monoamines (such as dimethylamine, diethylamine, dipropylamine, diisopropylamine, dibutylamine, bis(2-ethylhexyl)amine, N-methyl- and N-ethylcyclohexylamine or dicyclohexylamine) and also heterocyclic secondary amines (such as morpholine, pyrrolidine, piperidine or 1H-pyrazole). Preferred starter molecules are saturated monoalcohols. Particular preference is given to using diethylene glycol monobutyl ether as the starter molecule.

Alkylene oxides suitable for the alkoxylation reaction are, in particular, ethylene oxide and propylene oxide, which can be used in any order, separately from one another or in a mixture, in the alkoxylation reaction, so that block polyethers or copolyethers are obtained.

The compounds with a polyether structure are preferably pure polyethylene oxide polyethers or mixed polyalkylene oxide polyethers in which at least 30 mol %, preferably at least 40 mol %, of the alkylene oxide units are ethylene oxide units. Preferred nonionic compounds are monofunctional mixed polyalkylene oxide polyethers which contain at least 40 mole % of ethylene oxide units and not more than 60 mole % of propylene oxide units.

Especially when using a hydrophilic agent containing ionic groups it is necessary to examine its effect on the activity of the catalyst D). For this reason, if the hydrophilic polyisocyanates are to be used, nonionic hydrophilic agents are preferred.

Examples of suitable compounds B), which can be used alone or in admixture, include 2-hydroxyethyl (meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone) mono (meth)acrylates (e.g. Tone M100® Dow, Schwalbach, DE), 2-hydroxypropyl (meth)acrylate, 4-hydroxybutyl (meth)acrylate, hydroxybutyl vinyl ether, 3-hydroxy-2,2-dimethylpropyl (meth)acrylate, the hydroxy-functional mono-, di- or higher functional acrylates such as glyceryl di(meth)acrylate, trimethylolpropane di(meth)acrylate, pentaerythritol tri (meth)acrylate or dipentaerythritol penta(meth)acrylate, which are obtained by reacting polyhydric, optionally alkoxylated, alcohols such as trimethylolpropane, glycerol, pentaerythritol or dipentaerythritol with (meth)acrylic acid.

Also suitable as component B) are alcohols obtained from the reaction of acids containing double bonds with epoxide compounds optionally containing double bonds, such as the reaction products of (meth)acrylic acid with glycidyl (meth)acrylate or bisphenol A diglycidyl ether. Additionally, it is also possible to use unsaturated alcohols which are obtained from the reaction of optionally unsaturated acid anhydrides with hydroxy compounds and epoxide compounds that optionally contain acrylate groups. Examples include the reaction products of maleic anhydride with 2-hydroxyethyl (meth)acrylate and glycidyl (meth)acrylate.

Particularly preferred compounds of component B) are 2-hydroxyethyl acrylate, 2-hydroxypropyl acrylate, 4-hydroxybutyl acrylate, Tone M100® (Dow, Schwalbach, DE), polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK) and the reaction products of acrylic acid with glycidyl methacrylate.

Component C) is selected from one or more saturated hydroxyl-containing compounds other than B), at least one of these compounds having an OH functionality of $\geq 2$. The compounds may be monomeric and/or polymeric. Suitable compounds are low molecular weight mono-, di- or polyols such as short-chain, i.e., containing 2 to 20 carbon atoms, aliphatic, araliphatic or cycloaliphatic monoalcohols, diols or polyols. Examples of monoalcohols include methanol, ethanol, the isomeric propanols, butanols, pentanols, and also diacetone alcohols, fatty alcohols or fluorinated alcohols (such as those obtained under the name Zonyl® from DuPont.

Examples of diols include ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene-glycol, cyclohexanediol, 1,4-cyclohexanedimethanol, 1,6-hexanediol, 1,2- and 1,4-cyclohexanediol, hydrogenated bisphenol A (2,2-bis(4-hydroxy-cyclohexyl)propane), and 2,2-dimethyl-3-hydroxypropyl 2,2-dimethyl-3-hydroxypropionate.

Examples of suitable triols include trimethylolethane, trimethylolpropane or glycerol and examples of suitable polyols include ditrimethylolpropane, pentaerythritol, dipentaerythritol and orbitol. Preferred alcohols are 1,4-butanediol, 1,4-cyclohexanedimethanol, 1,6-hexanediol and trimethylolpropane.

Suitable higher molecular weight polyols include polyester polyols, polyether polyols, hydroxy-functional (meth) acrylate (co)polymers, hydroxy-functional polyurethanes or the corresponding hybrids (cf. Römpp Lexikon Chemie, pp. 465-466, 10th ed. 1998, Georg-Thieme-Verlag, Stuttgart).

For the preparation of the hydroxy-functional polyesters there are 6 groups of monomer constituents in particular that may be employed.

1. (Cyclo)alkanediols such as dihydric alcohols having (cyclo)aliphatically bound hydroxyl groups. Examples include the preceding low molecular weight diols, and also polyethylene, polypropylene or polybutylene glycols having a number average molecular weight of 200 to 4000, preferably 300 to 2000 and more preferably 450 to 1200. Reaction products of these diols with ε-caprolactone or other lactones are also suitable diols.
2. Alcohols with a functionality of 3 or more and having a molecular weight of 92 to 254, such as glycerol, trimethylolpropane, pentaerythritol, dipentaerythritol and sorbitol; polyethers prepared starting from these alcohols, such as the reaction product of 1 mol of trimethylolpropane with 4 mol of ethylene oxide; or alcohols obtained by the reaction of these alcohols with ε-caprolactone or other lactones.
3. Monoalcohols such as ethanol, 1- and 2-propanol, 1- and 2-butanol, 1-hexanol, 2-ethylhexanol, cyclohexanol and benzyl alcohol.
4. Dicarboxylic acids having a number average molecular weight of 104 to 600 and/or their anhydrides, such as phthalic acid, phthalic anhydride, isophthalic acid, tetrahydrophthalic acid, tetra-hydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, and hydrogenated dimer fatty acids.
5. Higher polyfunctional carboxylic acids and/or their anhydrides such as trimellitic acid and trimellitic anhydride.
6. Monocarboxylic acids, such as benzoic acid, cyclohexanecarboxylic acid, 2-ethylhexanoic acid, caproic acid, caprylic acid, capric acid, lauric acid, and natural and synthetic fatty acids.

Suitable hydroxyl-containing polyesters include the reaction product of at least one constituent from group 1 or 2 with at least one constituent from group 4 or 5. It is also possible to use the previously described reaction products of alcohols with lactones. The hydroxyl-containing polyesters have number-average molecular weights of 500 to 10,000, preferably 800 to 3000 g/mol and a hydroxyl group content of 1% to 20%, preferably 3% to 15% by weight. The polyesters can be employed at 100% solids or in solution in the solvents or reactive diluents that are described below and are suitable for the process of the invention.

In addition to the preceding polyester polyols, dendrimeric or hyperbranched compounds are also suitable, such as those obtained from ethoxylated pentaerythritol and dimethylolpropionic acid.

Suitable polycarbonate polyols are obtained by reacting the alcohols mentioned above for preparing the polyester polyols with organic carbonates such as diphenyl, dimethyl or diethyl carbonate in accordance with known methods. They preferably have number average molecular weights of 500 to 5000, more preferably 750 to 2500 g/mol, and hydroxyl functionalities of 1.5 to 3.

Examples of suitable polyethers include the alkylene oxide polyethers that are prepared from the previously mentioned low molecular weight mono-, di- or polyols. Also suitable are polyethers obtained by polymerizing tetrahydrofuran. The polyethers have number average molecular weights of 400 to 13,000, preferably 400 to 2500, and more preferably 500 to 1200 g/mol, and a hydroxyl group content of 1% to 25%, preferably 3% to 15% by weight.

(Meth)acrylate (co)polymers are described at length in WO 03/000812 on pages 8 to 16 as well as suitable preparation processes, the (meth)acrylate (co)polymers that are suitable in accordance with the invention are those which have at least one hydroxyl group. The (meth)acrylate (co)polymers preferably have number average molecular weights of 500 to 10,000, more preferably 1000 to 5000, and a hydroxyl group content of 1% to 20%, preferably 3% to 15% by weight.

Particular preference is given to monomeric di- or triols, and also polyethers and/or polylactones derived therefrom and having a nnumber average molecular weight below 1000 g/mol.

Suitable catalyst compounds D) include, in addition to the ammonium or phosphonium salts of aliphatic carboxylic acids for use in accordance with the invention, the compounds known for catalyzing the reaction of isocyanate groups with isocyanate-reactive groups, individually or in mixtures with one another.

Examples include tertiary amines such as triethylamine, pyridine, methylpyridine, benzyldimethylamine, N,N-endoethylenepiperazine, N-methylpiperidine, penta-methyldiethylenetriamine, N,N-dimethylaminocyclohexane, N,N'-dimethylpiperazine or 1,4-diazabicyclo[2.2.2]octane (DABCO), or metal salts such as iron(III) chloride, tin(II) octoate, tin(II) ethylcaproate, tin(II) palmitate, dibutyltin(IV) dilaurate, dibutyltin(IV) diacetate and molybdenum glycolate or mixtures of such catalysts.

Suitable catalysts for use as component D) include tetrasubstituted ammonium or phosphonium salts of aliphatic or cycloaliphatic carboxylic acids, preferably those corresponding to formula (II),

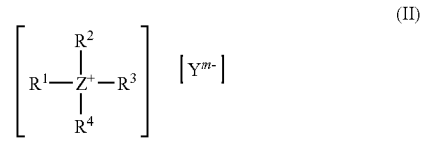

wherein
Z is nitrogen or phosphorus,
$R^1$, $R^2$, $R^3$, $R^4$ independently of one another are hydrogen or identical or different aliphatic, cycloaliphatic or araliphatic radicals having up to 24 carbon atoms and
Y is a carboxylate radical corresponding to formula (III),

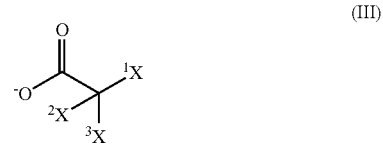

wherein $^1X$, $^2X$, $^3X$ independently of one another are substituents selected from hydrogen, halogen, cyano, hydroxyl, amide, ether, ester, thioether, ketone, aldehyde and carboxylate group and also aliphatic or cycloaliphatic radicals having up to 24 carbon atoms, which are optionally part of a cyclic or polycyclic system.

Preferred tetrasubstituted ammonium or phosphonium salts of aliphatic or cycloaliphatic carboxylic acids of formula (II) are tetraalkylammonium carboxylates which are preferably based on aliphatic carboxylic acids with branched alkyl radicals without additional functional groups.

Particularly preferred tetraalkylammonium carboxylates are tetrabutylammonium 2-ethylhexanoate, tetrabutylammonium pivalate, choline 2-ethylhexanoate, choline pivalate, methylcholine 2-ethylhexanoate and/or methylcholine pivalate, the preparation of which is described in U.S. Pat. No. 5,691,440.

In a preferred embodiment of the invention the preceding carboxylates are used as the sole compound of component D).

It is also possible to apply catalysts D) to support materials by methods known and to use them as heterogeneous catalysts.

The compounds of catalyst component D) can be dissolved advantageously in one of the components used in the process, or in a portion thereof. In particular, the carboxylates for use in accordance with the invention dissolve very well in the polar hydroxyalkyl acrylates, so that D) in solution in small amounts of B) can be metered in as a concentrated solution in liquid form.

In the process of the invention catalyst component D) is preferably used in amounts of 0.001 to 5.0% by weight, more preferably 0.01 to 2.0% by weight and most preferably 0.05 to 1.0% by weight, based on solids content of the product.

As component E) it is possible to use solvents or reactive diluents. Suitable solvents are inert towards the functional groups present in the product from the time of their addition until the end of the process. Suitable solvents include those used in the coating industry, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide. It is preferred not to add any solvent.

As reactive diluents it is possible to use compounds which during UV curing are (co)polymerized and thus incorporated into the polymer network. When these reactive diluents are contacted with NCO-containing compounds A), they must be inert towards NCO groups. When they are added only after the reaction of A) with B), this restriction does not apply. Such reactive diluents are described, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably acrylic acid, with mono- or polyfunctional alcohols. Examples of suitable alcohols include the isomeric butanols, pentanols, hexanols, heptanols, octanols, nonanols and decanols; cycloaliphatic alcohols such as isobomol, cyclohexanol and alkylated cyclohexanols; dicyclopentanol; arylaliphatic alcohols such as phenoxyethanol and nonylphenylethanol; and tetrahydrofurfuryl alcohols. Additionally, it is possible to use alkoxylated derivatives of these alcohols.

Suitable dihydric alcohols include alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol, tripropylene glycol or alkoxylated derivatives of these alcohols. Preferred dihydric alcohols are hexane-1,6-diol, dipropylene glycol and tripropylene glycol. Suitable trihydric alcohols include glycerol or trimethylolpropane or their alkoxylated derivatives. Tetrahydric alcohols include pentaerythritol or its alkoxylated derivatives.

The binders of the invention must be stabilized against premature polymerization. Therefore, as a constituent of component E), before and/or during the reaction, preferably phenolic stabilizers are added which inhibit the polymerization. Use is made in this context of phenols such as para-methoxyphenyl, 2,5-di-tert-butylhydroquinone or 2,6-di-tert-butyl-4-methylphenol. Also suitable are N-oxyl compounds for stabilization, such as 2,2,6,6-tetramethylpiperidine N-oxide (TEMPO) or its derivatives. The stabilizers can also be incorporated chemically into the binder; suitability in this context is possessed by compounds of the abovementioned classes, especially if they still carry further free aliphatic alcohol groups or primary or secondary amine groups and thus can be attached chemically to compounds of component A) by way of urethane or urea groups. Particularly suitable for this purpose are 2,2,6,6-tetramethyl-4-hydroxypiperidine N-oxide. Preferred are phenolic stabilizers, especially para-methoxyphenol and/or 2,6-di-tert-butyl-4-methylphenol.

Other stabilizers, such as hindered amine light stabilizers (HALS), in contrast, are used less preferably in E), since they are known not to enable such effective stabilization and instead may lead to "creeping" free-radical polymerization of unsaturated groups.

In order to stabilize the reaction mixture, in particular the unsaturated groups, against premature polymerization it is possible to pass an oxygen-containing gas, preferably air, into and/or over the reaction mixture. It is preferred for the gas to have a very low moisture content in order to prevent unwanted reaction in the presence of isocyanate.

In general a stabilizer is added during the preparation of the binders of the invention, and at the end, in order to achieve a long-term stability, stabilization is repeated with a phenolic stabilizer, and optionally the reaction product is saturated with air.

In the process of the invention the stabilizer component is typically used in amounts of 0.001 to 5.0% by weight, preferably 0.01 to 2.0% by weight and more preferably 0.05 to 1.0% by weight, based on the solids content of the product.

The process of the invention is carried out is such that A) is first reacted with B) until all of the NCO groups have been reacted. The resulting intermediate can optionally be stored and/or transported. This is then followed by the reaction of the uretdione groups with component C).

The ratio of NCO groups in A) to NCO-reactive groups in B) is from 1:1 to 1:1.5, preferably 1:1 to 1:1.2 and more preferably 1:1. The ratio of uretdione groups in A) to hydroxyl groups in C) is 1:0.4 to 1:6, preferably 1:0.9 to 1:4 and more preferably 1:0.9 to 1:2. In addition it is essential that the sum of the NCO groups and uretdione groups in A) exceeds the sum of the NCO-reactive groups and uretdione-reactive groups in B).

Depending upon the proportions selected, products are obtained which either are free from hydroxyl groups or still contain hydroxyl groups. These products preferably contain not only the radiation-curing groups but also NCO-reactive groups. The process of the invention is carried out preferably at temperatures of 20 to 130° C., more preferably of 40 to 90° C.

The viscosity of the binders obtained in accordance with the invention depends in particular on functionality, molecular weight and the chemical nature of component C) and also on the stoichiometric proportions used. When the preferred monomeric diols or triols, and also polyethers and/or polyacetones derived therefrom having a number average molecular weight below 1000 g/mol are used, this results in binders preferably having a viscosity of below 100,000 mPa·s at 23° C., more preferably below 75,000 mPa·s at 23° C. The number average molecular weight is preferably 500 to 5000, more preferably 800 and 2000 g/mol.

The process of the invention may be carried out continuously, e.g., in a static mixer, or batchwise, e.g., in a stirred reactor.

Preferably the process of the invention is carried out in a stirred reactor, in which case the sequence of addition of components A) and B) in the first process step and of intermediate AB) and component C) in the second process step is arbitrary. The stabilizers present in E) are added preferably before component B) is exposed to a thermal load. The other parts of component E) can be added at any desired time. The tetrasubstituted ammonium or phosphonium salts of aliphatic or cycloaliphatic carboxylic acids of D) are preferably not added until after the preparation of the intermediate AB).

The course of the reaction can be monitored by means of suitable measuring instruments installed in the reaction vessel and/or on the basis of analyses of samples taken. Suitable techniques are known. They include, for example, viscosity measurements, measurements of the refractive index, of the OH content, gas chromatography (GC), nuclear magnetic resonance (NMR) spectroscopy, infrared (IR) spectroscopy and near-infrared (NIR) spectroscopy. Preferred is using IR to check for any free NCO groups present (for aliphatic NCO groups, band at approximately $v=2272$ cm$^{-1}$) and, in particular, for uretdione groups (e.g. band for uretdiones based on hexamethylene diisocyanate at $v=1\ 761$ cm$^{-1}$) and to GC analyses for unreacted compounds from B) and C).

It is possible not to carry out the reaction of the uretdione groups with the hydroxyl groups completely, but instead to terminate the reaction on reaching a certain conversion. A further (creeping) reaction can then be suppressed by adding known acidic agents for stabilizing isocyanate groups. Preferred acids or acid derivatives include benzoyl chloride, phthaloyl chloride, phosphinous, phosphonous and/or phosphorous acid, phosphinic, phosphonic and/or phosphoric acid, the acidic esters of the preceding 6 acid types, sulphuric acid and its acidic esters and/or sulphonic acids.

The binders of the invention can be used for producing coatings and paints and also adhesives, printing inks, casting resins, dental compounds, sizes, photoresists, stereolithography systems, resins for composite materials and sealants. In the case of adhesive bonding or sealing, it is a requirement, in the case of UV radiation curing, at least one of the two substrates to be bonded or sealed to one another is permeable to UV radiation, i.e, it must be transparent. In the case of electron beams, sufficient permeability for electrons should be ensured. Preferably, the binders are used in paints and coatings.

The coating compositions according to the invention contain a) one or more binders obtained in accordance with the invention,
b) optionally one or more polyisocyanates containing free or blocked isocyanate groups, which optionally contain groups which react with ethylenically unsaturated compounds with polymerization on exposure to actinic radiation,
c) optionally compounds other than a), which contain groups which react with ethylenically unsaturated compounds with polymerization on exposure to actinic radiation, and optionally contain NCO-reactive groups,
d) optionally one or more isocyanate-reactive compounds containing an active hydrogen which are free from groups which react with ethylenically unsaturated compounds with polymerization on exposure to actinic radiation,
e) one or more initiators and
f) optionally additives.

Suitable polyisocyanates b) are aromatic, araliphatic, aliphatic or cycloaliphatic di- or polyisocyanates. Mixtures of such diisocyanates or polyisocyanates can also be used. Examples of suitable diisocyanates or polyisocyanates include butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof of any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane 4,4',4"-triisocyanate or polyisocyanate adducts prepared these di- and polyisocyanates and containing urethane, urea, carbodiimide, acylurea, isocyanurate, allophanate, biuret, oxadiazinetrione, uretdione, iminooxadiazine dione groups, and mixtures thereof.

Preferred are polyisocyanate adducts based on oligomerized and/or derivatized diisocyanates which have been freed from excess diisocyanate by suitable methods, particularly those adducts prepared from hexamethylene diisocyanate, isophorone diisocyanate and of the isomeric bis(4,4'-isocyanatocyclohexyl)-methanes and also mixtures thereof. Especially preferred are polyisocyanate adducts containing isocyanurate and/or iminooxadiazine dione groups and prepared from HDI and also to polyisocyanate adducts containing isocyanurate groups and prepared from IPDI.

It is also possible to use the preceding isocyanates blocked with known blocking agents. Examples include alcohols, lactams, oximes, malonates, alkyl acetoacetates, triazoles, phenols, imidazoles, pyrazoles and also amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester and mixtures thereof.

Polyisocyanates b) may optionally contain one or more functional groups which react, with polymerization, with ethylenically unsaturated compounds on exposure to actinic radiation. These groups may be prepared by reacting the unsaturated and isocyanate-reactive compounds specified under B), including the preferred ranges, with saturated polyisocyanates by known methods. NCO-containing urethane acrylates of this kind are available commercially from Bayer AG, Leverkusen, DE as Roskydal® UA VP LS 2337, Roskydal® UA VP LS 2396 or Roskydal® UA XP 2510.

Suitable compounds for use as component c) are polymers (such as polyacrylates, polyurethanes, polysiloxanes, polyesters, polycarbonates and polyethers) containing groups which react, with polymerization, with ethylenically unsaturated compounds through exposure to actinic radiation. Such groups include α,β-unsaturated carboxylic acid derivatives such as acrylates, methacrylates, maleates, fumarates, maleimides and acrylamides; vinyl ethers; propenyl ethers; allyl ethers; and compounds containing dicyclopentadienyl units. Preferred are acrylates and methacrylates. Examples include the reactive diluents known in radiation curing technology and described as suitable for use under E) (cf. Römpp Lexikon Chemie, p. 491, 10th ed. 1998, Georg-Thieme-Verlag, Stuttgart) or the known binders from radiation curing technology, such as polyether acrylates, polyester acrylates, urethane acrylates, epoxy acrylates, melamine acrylates, silicone acrylates, polycarbonate acrylates and acrylated polyacrylates, which optionally contain isocyanate-reactive groups, preferably hydroxyl groups.

Suitable compounds d) include the hydroxy-functional monomeric or polymeric compounds described under C), and also water, which is contacted with the remaining constituents only after coating, optionally in the form of atmospheric moisture. Additionally it is possible to use NH-functional compounds such as amine-terminated polyethers, polyamines and aspartates.

Suitable initiators for free-radical polymerization, which can be used as component e), are those which can be activated thermally and/or by radiation. Photoinitiators, which are activated by UV or visible light, are preferred in this context. The photoinitiators are known compounds. A distinction is made between unimolecular (type I) and bimolecular (type II) initiators. Suitable (type I) systems include aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures thereof. Suitable (type II) initiators include benzoin and its derivatives, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones.

The initiators are used in amounts of 0.1% to 10% by weight, preferably 0.1% to 5% by weight, based on the weight of the film-forming binder. The initiators can be used individually or, to obtain advantageous synergistic effects, in combination with one another.

When electron beams are used instead of UV irradiation there is no need for a photoinitiator. Electron beams are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P. K. T Oldring (Ed.), SITA Technology, London, England, pp. 101-157, 1991.

Thermal curing of the activated double bonds can take place with the addition of thermally decomposing free-radical initiators. Suitable initiators include peroxy compounds such as dialkoxy dicarbonates, for example, bis(4-tert-butylcyclohexyl) peroxydicarbonate; dialkyl peroxides such as dilauryl peroxide; peresters of aromatic or aliphatic acids such as tert-butyl perbenzoate or tert-amyl peroxy 2-ethylhexanoate; inorganic peroxides such as ammonium peroxodisulphate or potassium peroxodisulphate; organic peroxides such as 2,2-bis(tert-butylperoxy)butane, dicumyl peroxide or tert-butyl hydroperoxide; and azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methylpropionamides), 2,2'-azobis{2-methyl-N-[2-(1-hydroxybutyl)]propionamides}, 2,2'-azobis{2-methyl-N-[2-(1-hydroxybutyl)]propionamides, or 2,2'-azobis{2-methyl-N-[1,1-bis(hydroxymethyl)-2-hydroxyethyl] propionamides. Also suitable are highly substituted 1,2-diphenylethanes (benzpinacols) such as 3,4-dimethyl-3,4-diphenylhexane, 1,1,2,2-tetraphenylethane-1,2-diol or the silylated derivatives thereof.

It is also possible to use a combination of initiators activable by UV light and thermally.

Additives f) include solvents of the type specified above under E). Additionally, it is possible for f), in order to increase the weather stability of the cured coating film, to contain UV absorbers and/or HALS stabilizers. Preferred is a combination of these stabilizers. The UV absorbers should have an absorption range of not more than 390 nm, such as the triphenyltriazine types (e.g. Tinuvin® 400 (Ciba Spezialitatenchemie GmbH, Lampertheim, DE)), benzotriazoles such as Tinuvin® 622 (Ciba Spezialitatenchemie GmbH, Lampertheim, DE) or oxalic dianilides (e.g. Sanduvor® 3206 (Clariant, Muttenz, CH))). They are added at 0.5% to 3.5% by weight, based on resin solids. Suitable HALS stabilizers are also available commercially and include (Tinuvin® 292 or Tinuvin® 123 (Ciba Spezialitatenchemie GmbH, Lampertheim, DE) or Sanduvor® 3258 (Clariant, Muttenz, CH). They are preferably added in amounts of 0.5% to 2.5% by weight based on resin solids.

It is also possible for component f) to contain pigments, dyes, fillers, levelling additives and devolatilizing additives.

Additionally it is possible, if necessary, for the catalysts known from polyurethane chemistry for accelerating the NCO/OH reaction to be present in f). They include tin salts or zinc salts or organotin compounds, tin soaps and/or zinc soaps, such as tin octoate, dibutyltin dilaurate, dibutyltin oxide, tertiary amines such as diazabicyclo[2.2.2]octane (DABCO), bismuth compounds, zirconium compounds or molybdenum compounds.

The application of the coating compositions of the invention to the material to be coated takes place using the methods known in coatings technology, such as spraying, knife coating, rolling, pouring, dipping, spin coating, brushing or squirting or by means of printing techniques such as screen, gravure, flexographic or offset printing and also by means of transfer methods.

Suitable substrates include wood, metal, including in particular metal as used in the applications of wire enamelling, coil coating, can coating or container coating, and also plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1), paper, leather, textiles, felt, glass, wood, wood materials, cork, inorganically bonded substrates such as wooden boards and fiber cement slabs, electronic assemblies or mineral substrates. It is also possible to coat substrates containing a variety of the preceding materials, or to coat already coated substrates such as vehicles, aircraft or boats and also parts thereof, especially vehicle bodies or parts for exterior mounting. It is also possible to apply the coating compositions to a substrate temporarily, then to cure them partly or fully and optionally to detach them again, in order to produce films.

For curing it is possible to remove solvents present entirely or partly by flashing off. Subsequently or simultaneously it is possible for the optional thermal and the photochemical curing operation or operations to be carried out in succession or simultaneously. If necessary the thermal curing can take place at room temperature or at elevated temperature, preferably at 40 to 160° C., preferably at 60 to 130° C. and more preferably at 80 to 110° C.

Where photoinitiators are used in e) the radiation cure takes place preferably by exposure to high-energy radiation, in other words UV radiation or daylight, such as light having a wavelength 200 to 700 μm. Radiation sources of light or UV light include high-pressure or medium-pressure mercury vapor lamps. It is possible for the mercury vapor to have been modified by doping with other elements such as gallium or iron. Lasers, pulsed lamps (known under the designation of UV flashlight lamps), halogen lamps or excimer emitters may also be used. As an inherent part of their design or through the use of special filters and/or reflectors, the emitters may be equipped so that part of the UV spectrum is prevented from being emitted. By way of example, for reasons of occupational hygiene, for example, the radiation assigned to UV-C or to UV-C and UV-B may be filtered out. The emitters may be installed in stationary fashion, so that the material for irradiation is conveyed past the radiation source by means of a mechanical device, or the emitters may be mobile and the material for irradiation may remain stationary during curing. The radiation dose which is normally sufficient for crosslinking in the case of UV curing is from 80 to 5000 mJ/cm$^2$.

Irradiation can also be carried out in the absence of oxygen, such as under an inert gas atmosphere or an oxygen-reduced atmosphere. Suitable inert gases are preferably nitrogen, carbon dioxide, noble gases or combustion gases. Irradiation may additionally take place by covering the coating with media transparent to the radiation. Examples include polymeric films, glass or liquids such as water.

Depending on the radiation dose and curing conditions it is possible to vary the type and concentration of any initiator used in known manner.

Particular preference is given to carrying out curing using high-pressure mercury lamps in stationary installations. Photoinitiators are then employed at concentrations of from 0.1% to 10% by weight, more preferably from 0.2% to 3.0% by weight, based on the solids content of the coating composition. For curing these coatings it is preferred to use a dose of from 200 to 3000 mJ/cm$^2$, measured in the wavelength range from 200 to 600 nm.

When thermally activable initiators are used in d), curing is carried out by increasing the temperature. The thermal energy may be introduced into the coating by means of radiation, thermal conduction and/or convection using ovens, near-infrared lamps and/or infrared lamps that are known in coatings technology.

The applied film thicknesses (prior to curing) are typically between 0.5 and 5000 μm, preferably between 5 and 1000 μm and more preferably between 15 and 200 μm. Where solvents are used, they are removed after application and before curing by known methods.

EXAMPLES

All percentages are by weight unless indicated otherwise.

The NCO contents in % were determined by back-titration with 0.1 mol/l hydrochloric acid following reaction with butylamine in accordance with DIN EN ISO 11909.

The viscosity measurements were carried out using a Viskolab LC3/ISO plate-and-cone viscometer (SM-KP) from Paar Physica, Ostfildern, DE in accordance with ISO/DIS 3219:1990.

Infrared spectroscopy was on liquid films applied between sodium chloride plates on a model 157 instrument from Perkin Elmer, Überlingen, DE.

The contents of residue monomers and volatile synthesis components were analyzed by GC (method using tetradecane as internal standard, oven temperature 110° C., injector temperature 150° C., carrier gas helium, instrument: 6890 N, Agilent, Waldbronn, DE, column: Restek RT 50, 30 m, 0.32 mm internal diameter, film thickness 0.25 μm).

The solids content was determined in accordance with DIN 53216/1 draft 4/89, ISO 3251.

An ambient temperature of 23° C., which prevailed at the time when the experiments were conducted, is referred to as RT.

Desmodur® N 3400—HDI polyisocyanate predominantly containing uretdione groups, viscosity 185 mPa·s/23° C., NCO content 21.4%, commercial product of Bayer MaterialScience AG, Leverkusen, DE Desmorapid® Z—dibutyltin dilaurate (DBTL), commercial product of Bayer MaterialScience AG, Leverkusen, DE Darocur® 1173—photoinitiator, commercial product of Ciba Spezialitätenchemie GmbH, Lampertheim, DE Example 1 describes the preparation of a suitable catalytically active carboxylate, which is employed in Examples 3-4 according to the invention. Example 2 describes the preparation of a urethane acrylate containing uretdione groups by urethanization. This is employed in Examples 3-4.

Example 1

Choline 2-ethylhexanoate 272.13 g of a 40% solution of choline hydroxide and 145.73 g of 2-ethylhexanoic acid were stirred vigorously for 30 min at RT in a glass flask with reflux condenser, heatable oil bath, mechanical stirrer and internal thermometer. Water and methanol were distilled off in a rotary evaporator at 30-45° C. under a vacuum increased gradually to 20 mbar. The product was then taken up in n-hexane and re-evaporated in the rotary evaporator and dried at 0.1 mbar and 40° C. for 2 h, giving a slightly colored, viscous liquid whose $^1$H-NMR spectrum showed equi-molar ratios of choline and ethylhexanoate, but only a weak signal in the region of aliphatic carboxylic acids.

Example 2

Urethane Acrylate Containing Uretdione Groups 194.90 g of Desmodur® N3400, 0.31 g of 2,6-di-tert-butyl-4-methylphenol and 0.005 g of Desmorapid® Z were introduced at RT into a three-necked flask with reflux condenser, stirrer, dropping funnel and air stream (0.5 l/h) and then heated to 60° C. 116.00 g of 2-hydroxyethyl acrylate were slowly added dropwise, during which a maximum temperature of 70° C. was reached. The reaction mixture was then held at 70° C. until the NCO content was <0.1%. On cooling, the product solidified to give a wax-like solid.

Example 3

Allophanate-containing Binder According to the Invention

In an apparatus analogous to Example 2, 70.2 g of the urethane acrylate obtained therein were melted at 80° C., and 20.0 g of butyl acetate, 9.6 g of an on average tetraethoxylated, trimethylolpropane-initiated polyether (hydroxyl number 550, dynamic viscosity 505 mPa·s at 23° C.) and 0.24 g of the catalyst from Example 1 were added. The reaction mixture was stirred at 80° C. until, after 3.0 h, only a very weak signal for uretdione groups was detected in the IR spectrum at ν=1768 cm$^{-1}$. The resulting clear product had a viscosity of 5000 mPa·s/23° C., a solids content of 81.1% and an NCO content of 0%.

Example 4

Allophanate-containing Binder According to the Invention

Example 3 was repeated, with the difference that only 66.9 g of urethane acrylate and 12.8 g of the polyether were used. The reaction mixture was stirred at 80° C. until, after 3.5 h, only a very weak signal for uretdione groups was detected in the IR spectrum at $v=1768$ cm$^{-1}$. 0.08 g of isophthaloyl dichloride was subsequently stirred in, and the reaction mixture was cooled to RT. The resulting clear product had a viscosity of 4550 mPa·s/23° C., a solids content of 80.8%, a hydroxyl number of 33 (theoretical 35) and an NCO content of 0%.

Comparison Examples 5 and 6

Attempts to Prepare an Allophanate-containing Binder

The catalysts described in U.S.-A 2003/0153713 for the crosslinking of powder coating compositions containing uretdione group-containing curing agents and polymeric hydroxyl compounds without activated double bonds were tested for suitability.

Comparison Example 5—Example 3 was repeated with the difference that the catalyst from Example 1 was replaced with an equal molar amount of tetrabutylammonium hydroxide.

Comparsion Example 6—Example 3 was repeated with the difference that the catalyst from Example 1 was replaced with an equal molar amount of tetrabutylammonium fluoride.

|  | (Comparison) Example | | |
| --- | --- | --- | --- |
|  | 2 | 5 | 6 |
| Reaction time after addition of catalyst | 3.0 h | 2.5 h | 2.0 h |
| Visual assessment | Clear | Very cloudy | Very cloudy |
| Solids content [%] | 81.1 | 81.7 | 82.2 |
| Viscosity [mPa s] at 23° C. | 5000 | 12,000 | 16,000 |

The comparisons show that the products according to comparison Examples 5 and 6 have higher viscosities and because of the significant cloudiness that occurs, are virtually unsuitable as coating compositions.

Example 7

Paint Formulation and Paint

A portion of the product from Example 3 was mixed thoroughly with 3.0% of the photoinitator Darocur® 1173. Using a bone hand coater with a gap of 90 μm, the mixture was drawn as a thin film onto a glass plate. After UV irradiation (medium-pressure mercury lamp, IST Metz GmbH, Nürtingen, DE, 750 mJ/cm$^2$) a transparent, hard and solvent-resistant coating having a Pendel hardness of 97 s was obtained, which showed no visible change after 100 double rubs with a cotton pad soaked with butyl acetate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a binder which contains 1) allophanate groups, 2) groups that react with ethylenically unsaturated compounds with polymerization on exposure to actinic radiation (radiation-curing groups) and 3) optionally NCO-reactive groups, which comprises reacting at temperatures $\leq 130°$ C.
   A) one or more NCO-functional compounds containing uretdione groups with
   B) one or more compounds that contain isocyanate-reactive groups and contain groups that react with ethylenically unsaturated compounds with polymerization on exposure to actinic radiation (radiation-curing groups), and then with
   C) one or more saturated, hydroxyl-containing compounds other than B),
   at least one of these compounds having an OH functionality of $\leq 2$, in the presence of
   D) a catalyst containing one or more ammonium salts or phosphonium salts of aliphatic or cycloaliphatic carboxylic acids,
   the reaction with compounds C) taking place at least proportionally with the formation of allophanate groups.

2. The process of claim 1 wherein said compounds containing uretdione groups are prepared from hexamethylene diisocyanate.

3. The process of claim 2 wherein component B) comprises a member selected from the group consisting of 2-hydroxyethyl acrylate, 2-hydroxypropyl acrylate, 4-hydroxybutyl acrylate, polyethylene oxide mono(meth)acrylate, polypropylene oxide mono(meth)acrylate and the reaction product of acrylic acid with glycidyl methacrylate.

4. The process of claim 3 wherein component D) comprises a member selected from the group consisting of tetrabutylammonium 2-ethylhexanoate, tetrabutylammonium pivalate, choline 2-ethylhexanoate, choline pivalate, methylcholine 2-ethylhexanoate and methylcholine pivalate.

5. The process of claim 2 wherein component D) comprises a member selected from the group consisting of tetrabutylammonium 2-ethylhexanoate, tetrabutylammonium pivalate, choline 2-ethylhexanoate, choline pivalate, methylcholine 2-ethylhexanoate and methylcholine pivalate.

6. The process of claim 1 wherein component B) comprises a member selected from the group consisting of 2-hydroxyethyl acrylate, 2-hydroxypropyl acrylate, 4-hydroxybutyl acrylate, polyethylene oxide mono(meth)acrylate, polypropylene oxide mono(meth)acrylate and the reaction product of acrylic acid with glycidyl methacrylate.

7. The process of claim 6 wherein component D) comprises a member selected from the group consisting of tetrabutylammonium 2-ethylhexanoate, tetrabutylammonium pivalate, choline 2-ethylhexanoate, choline pivalate, methylcholine 2-ethylhexanoate and methylcholine pivalate.

8. The process of claim 1 wherein component C) comprises a member selected from the group consisting of monomeric diols, monomeric triols, poiyethers and polyacetones derived therefrom having a number average molecular weight of below 1000 g/mol.

9. The process of claim 1 wherein component D) comprises a member selected from the group consisting of tetrabutylammonium 2-ethylhexanoate, tetrabutylammonium pivalate, choline 2-ethylhexanoate, choline pivalate, methylcholine 2-ethylhexanoate and methylcholine pivalate.

10. The process of claim 1 wherein the reaction is carried out at a temperature of 20 to 100° C.

* * * * *